United States Patent
Horna et al.

(10) Patent No.: US 6,712,595 B2
(45) Date of Patent: Mar. 30, 2004

(54) NOZZLE HOLDER AND DEVICE FOR EXTRUDING DOUGH MATERIALS

(75) Inventors: Marc Horna, Ilsfeld (DE); Frank Altvater, Heilbronn (DE)

(73) Assignee: Hosokawa Bepex GmbH, Leingarten (DE)

(*) Notice: Subject to any disclaimer, the term of this patent is extended or adjusted under 35 U.S.C. 154(b) by 0 days.

(21) Appl. No.: 10/056,422

(22) Filed: Jan. 24, 2002

(65) Prior Publication Data

US 2002/0061343 A1 May 23, 2002

Related U.S. Application Data

(63) Continuation of application No. PCT/EP00/07551, filed on Aug. 3, 2000.

(30) Foreign Application Priority Data

Aug. 5, 1999 (DE) .......................... 199 36 823

(51) Int. Cl.⁷ .............................................. B29C 47/06
(52) U.S. Cl. .............................. 425/133.1; 425/192 R; 425/375; 425/381; 425/310
(58) Field of Search ...................... 425/133.1, 192 R, 425/375, 381, 462, 466, 310

(56) References Cited

U.S. PATENT DOCUMENTS

| | | | |
|---|---|---|---|
| 3,940,226 A | | 2/1976 | Verhoeven |
| 3,947,178 A | * | 3/1976 | Belshaw et al. .......... 425/133.1 |
| 4,659,580 A | * | 4/1987 | Svengren ................. 425/133.1 |
| 4,770,620 A | * | 9/1988 | Steinecke et al. ....... 425/192 R |
| 4,993,934 A | | 2/1991 | Groff |
| 5,286,183 A | * | 2/1994 | Tonsi et al. .............. 425/133.1 |

FOREIGN PATENT DOCUMENTS

| | | |
|---|---|---|
| DE | 1036783 | 8/1958 |
| DE | 3030757 A1 | 9/1981 |
| EP | 0168255 A1 | 1/1986 |
| EP | 0177175 A2 | 4/1986 |
| EP | 0287209 A2 | 10/1988 |
| FR | 808285 | 2/1937 |
| GB | 374530 | 6/1932 |
| NL | 63246 | 12/1948 |

* cited by examiner

*Primary Examiner*—Robert Davis
*Assistant Examiner*—Joseph S. Del Sole
(74) *Attorney, Agent, or Firm*—Clifford W. Browning; Woodard, Emhardt, Moriarty, McNett & Henry LLP

(57) ABSTRACT

A nozzle holder (14) with at least one nozzle (34'; 34"), which ends at a mouth (38'; 38"), is used for manufacturing baking articles (54) from an extruded strand (56). In order to manufacture baking articles (54) which extend in a plane, the nozzle (34'; 34") is pivotably mounted by means of a joint with a ball (32) and its mouth (38'; 38") is displaceable by a pivoting device (45) in two axes (X; Y) extending at right angles to one another. Furthermore, constructed in the ball (32) is at least one connecting duct (48'; 48"), of which one end is connected to a stationary feed duct (50'; 50") and the other end to the pivotable nozzle (34'; 34").

6 Claims, 3 Drawing Sheets

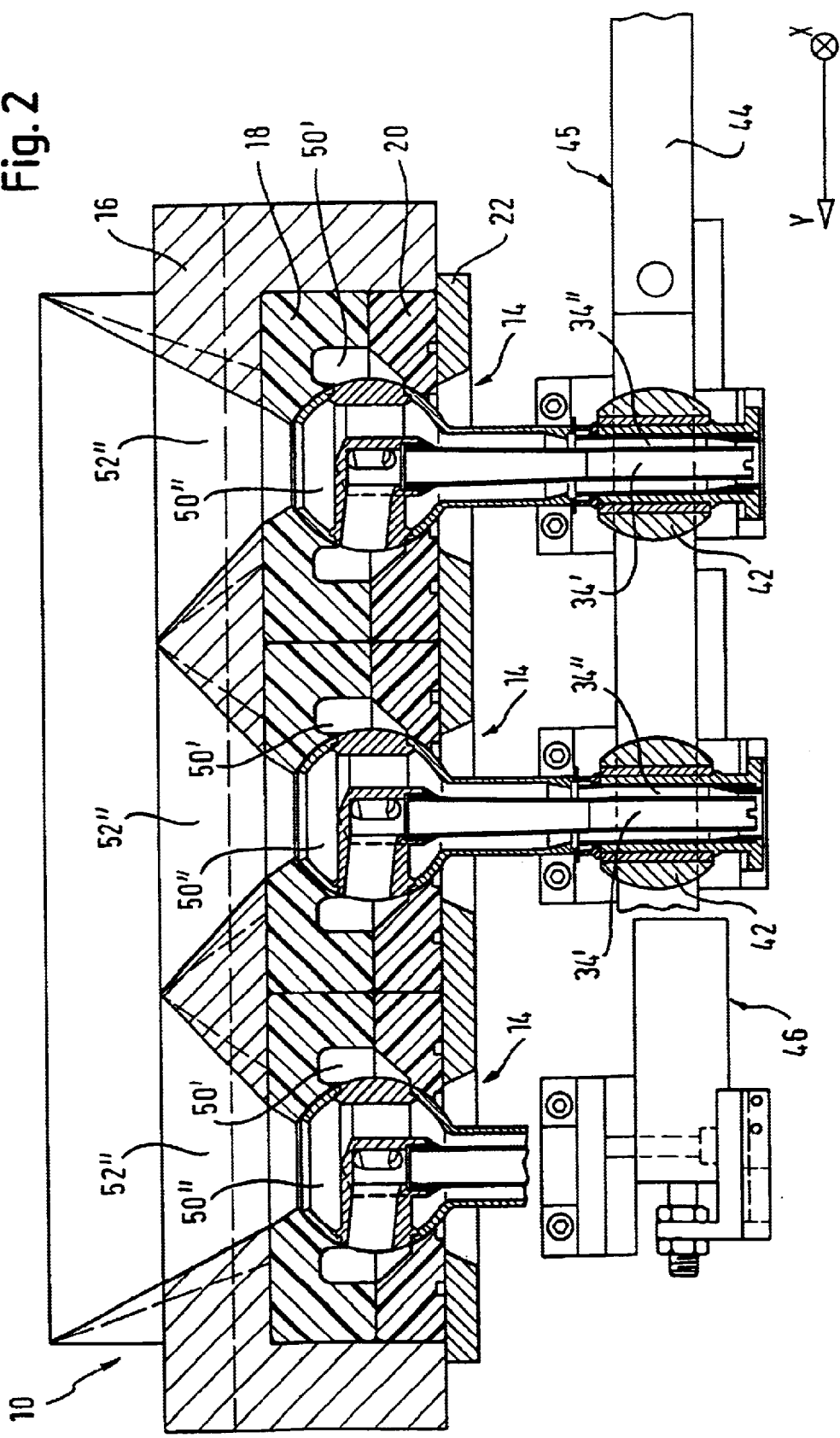

NOZZLE HOLDER AND DEVICE FOR EXTRUDING DOUGH MATERIALS

This application is a continuation of international application number PCT/EP00/07551, filed Aug. 3, 2000.

The invention relates to a nozzle holder and a device for extruding dough materials using the nozzle holder.

BACKGROUND OF THE INVENTION

Baking articles, doughs and confectionery are often extruded by squeezing a material under pressure through a nozzle arrangement to form a strand. As such, the strand may be carried away by a conveyor belt or cut into short sections. The outer shape of the strand, in particular its circumferential shape, is dependent upon the nozzle arrangement.

A machine is known from DE-A-30 30 757 for forming dough rings of edible dough, in which dough strands run over the edge of a first conveyor belt into a supply station. Here, as a result of their inherent weight the dough strands pass in each case into an upper end of a tube element, which is pivotably mounted by means of two ball joints. The dough strands emerge at the lower ends of the tube elements and are taken up by a second conveyor belt. The lower ends of the tube elements are movable by means of a cross bar. In this machine, it is not possible to supply a material under pressure to the tube elements. A blade, which is mounted independently of the cross bar, is used for cutting the dough strands. The blade may only be used when the cross bar with the lower ends of the tube elements is located at a specific point along its path of movement.

A device is known from DE-A-1 036 783 for manufacturing shapes from flowable dough material, in which the dough material is supplied via hoses to nozzles, which are secured to a retaining strip and are displaceable together with said retaining strip. During the movement of the nozzles the hoses are deformed, so that their volume and therefore the pressure of the dough material existing within them alters.

The device is therefore only suitable under certain conditions for producing dough products in which the dough needs to emerge from the nozzle at a precisely constant pressure.

A device is known from FR-A-808 285 for extruding dough and similar materials, in which a rotary nozzle comprises an eccentrically arranged opening, which can be supplied with a dough material under pressure through a feed duct. Only simple geometric shapes can be produced using rotary nozzles of this type.

Devices are known from EP-A-0 168 255 and EP-A-0 177 175 for co-extruding two materials, which extrude an inner material through a nozzle and an outer material with grainy particles contained therein through a funnel enclosing the nozzle, the materials being combined to form a strand. At its mouth, the funnel comprises sharp edges, so that the grainy particles in the outer material reach the surface. The mouth of the funnel may be toothed, so that the particles project from the surface. The composite strand is carried away by a conveyor belt in this manner, a baking article can be produced from two materials having a linear, longitudinal shape with grainy particles on the surface.

A disadvantage of the above-mentioned devices is that it is only possible to use said devices for manufacturing baking articles which extend in one direction, i.e. in the direction in which the strand is carried away. It is not possible to produce baking articles which extend in a plane or whose strands cross. Baking articles of this type are, for example, Chelsea buns, rings and pretzels.

SUMMARY OF THE INVENTION

It is the object of the invention to provide a nozzle holder and a device for extruding dough materials, by means of which baking articles and confectionery which extend in a plane can be manufactured with a high degree of shape accuracy.

This object is attained according to the invention by a nozzle holder having the features described below.

Although the nozzle according to the invention is pivotable, the connecting duct according to the invention—in contrast to the hoses known from DE-A-30 30 757—represents a non-elastic connection between the stationary feed duct and the nozzle. This connection is produced by already existing components and therefore has a particularly simple construction.

The nozzle holder is advantageously further developed in that the nozzle comprises a tube element, whose first end is pivotably mounted and whose second end comprises the mouth. As a result of the tube element, the degree of deflection of the nozzle during pivoting is increased, whilst precise guidance of the nozzle is ensured.

The mouth of the nozzle is guided in a particularly precise manner in that the pivoting device comprises a rod with a ball mounted therein. A pivoting device of this type can be easily cleaned.

It is provided in an advantageous embodiment that the nozzle holder comprises two nozzles, which are arranged concentric to one another. Using a nozzle holder of this type, it is also possible to produce baking articles which have a filling and a casing and extend in a plane. It is therefore possible to manufacture filled Chelsea buns or filled pretzels, for example.

A nozzle holder according to the invention is advantageously used in a device for extruding, a plurality of nozzle holders being particularly advantageously arranged adjacent one another and the mouths of the nozzles being pivotable in this case by means of a common pivoting device. In this manner, it is possible to manufacture a plurality of baking articles simultaneously having the same shape. In this respect, the pivoting device only needs to be controlled by a single control system, so that the manufacturing costs of the device are particularly low in relation to Its capacity.

The described device is advantageously developed in that a cutting and/or squeezing device is arranged on the pivoting device. The cutting and/or squeezing device is used for cutting and/or closing the extruded strand. Since the cutting and/or squeezing device is arranged on the pivoting device, it is possible to cut and/or dose the strand in any position of the pivoting device.

BRIEF DESCRIPTION OF THE DRAWINGS

An embodiment of a device according to the invention will be explained in further detail in the following with the aid of schematic drawings.

In the drawings:

FIG. 2 is a section taken along line II—II in FIG. 1.

DETAILED DESCRIPTION OF THE PREFERRED EMBODIMENTS

Figure 1:
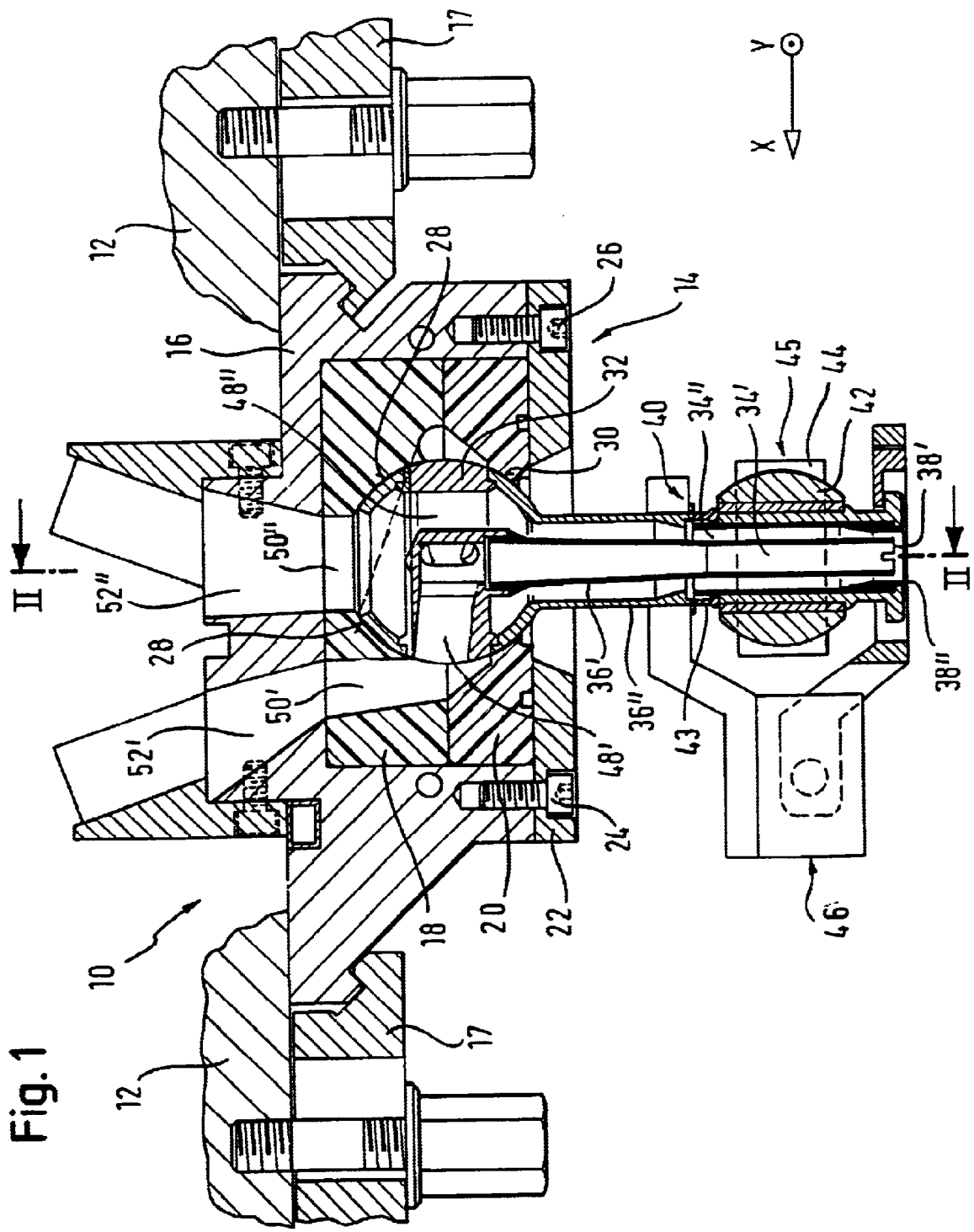
FIG. 1 is a longitudinal section through a device according to the invention for extruding dough materials.

FIG. 1 represents a device 10 for extruding dough materials. In a device 10 of this type, two materials can be supplied through a feed duct 52' and 52" respectively to two nozzles 34' and 34". The nozzles 34' and 34" comprise mouths 38' and 38", through which the extruded materials emerge and form a strand 56 of a baking article 54.

The device 10 comprises a housing 12, to which a nozzle holder 14 is secured. The nozzle holder 14 comprises a holder housing 16, which is secured by means of two retaining devices 17 to the housing 12 in such a manner that it can be easily replaced. In this manner, the device 10 can be rapidly converted to manufacture different baking articles by way of differently shaped nozzle holders 14.

Fitted in the holder housing 16 are two bearing plates 18 and 20. The bearing plates 18 and 20 are held by a support plate 22, which is secured to the holder housing 16 by a plurality of screws (only two screws 24 and 26 are illustrated).

The bearing plates 18 and 20 each comprises a spherical hollow 28, 30, which are arranged opposite one another and accommodate a ball 32. The ball 32 is guided in the hollows 28 and 30 in such a manner that a tight coupling is formed between the bearing plates 18 and 20, through which the materials to be extruded cannot pass. The ball 32 is however rotatable in the hollows 28 and 30.

In relation to FIGS. 1 and 2, two nozzles are arranged beneath the ball 32, an inner nozzle 34' and an outer nozzle 34". The nozzles 34' and 34" are formed by an inner tube element 36' and an outer tube element 36" respectively. The tube elements 36' and 36" end in mouths 38' and 38" respectively. The tube elements 36' and 36" are arranged concentric to one another, so that the inner nozzle 34' has a circular cross section, whilst the outer nozzle 34" has a circular ring cross section. Furthermore, the tube elements 36' and 36" are designed to be dividable at a connecting site 40, so that a pivoting device 45, described below, can be more easily removed and the nozzles 34' and 34" more easily cleaned.

At the circumference of the outer tube element 36", in relation to the lower region in FIGS. 1 and 2, a ball 42 is pushed over the tube element 36" and is secured to the connecting site 40 by a clamping or screwing connection 43. Accordingly, the connecting site 40 is also used for fitting the ball 42. The ball 42 is partially enclosed by a rod 44, which guides and rotatably accommodates the ball 42.

The rod 44 is part of a pivoting device 45, not illustrated in further detail. As is known to the person skilled in the art and therefore not explained further, a pivoting device 45 of this type may comprise electrical, hydraulic or pneumatic drives, which make it possible to displace and hold the rod 44 with high precision in the direction of two axes X and Y extending perpendicular to one another.

When the rod 44 is displaced, it moves the tube elements 36' and 36" guided in the ball 42. The mouths 38' and 38" of the nozzles 34' and 34" are thereby pivoted in the two axes X and Y and deflected in such a manner that the strand emerging during extrusion is laid in a plane. In this manner, it is possible to form a baking article which extends in a plane. The baking article may also comprise crossing or overlapping strands.

FIG. 2 shows that a plurality of nozzle holders 14 are arranged adjacent one another in the device 10 and their nozzles 34' and 34" are displaceable together by a rod 44.

Fitted to the pivoting device 45 is a cutting device 46, which can close directly beneath the mouths 38' and 38" and thereby Interrupt the emerging strand. The cutting device 46 may also be constructed as a squeezing device, which more particularly firstly closes and then cuts a filled strand.

The ends of the tube elements 36' and 36" lying opposite the mouths 38' and 38" are connected to the ball 32. In this respect, two connecting ducts 48' and 48" are constructed in the ball 32 which connect a tube element 36' and 36" to a feed duct 50' and 50" respectively.

In relation to FIGS. 1 and 2, the connecting duct 48' extends almost horizontal to the outside of the ball 32. The feed duct 50' is constructed as an annular chamber around the ball 32, so that the ball 32 can rotate, whilst a connection between the feed duct 50' and the connecting duct 48' is nevertheless formed. The nozzle holder 14 can therefore also be used for a rotary nozzle in which the nozzle or nozzles rotate about an axis in order to produce coiled or twisted baking articles.

The connecting duct 48" penetrates the ball 32 from top to bottom in relation to FIGS. 1 and 2 and thereby bypasses the connecting duct 48'. The connecting duct 48" is dimensioned at its opening to the feed duct 50" in such a manner that the ball 32 can rotate, whilst a connection nevertheless remains between the connecting duct 48" and the feed duct 50". The rotary movement of the ball 32 is more particularly limited by the clearance of the outer tube element 36" in the bearing plate 20.

Figure 4:
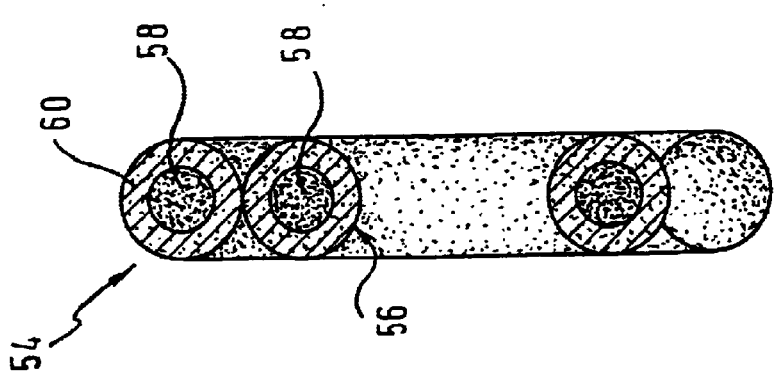
FIG. 4 is a section taken along line IV—IV in FIG. 3.
Figure 3:
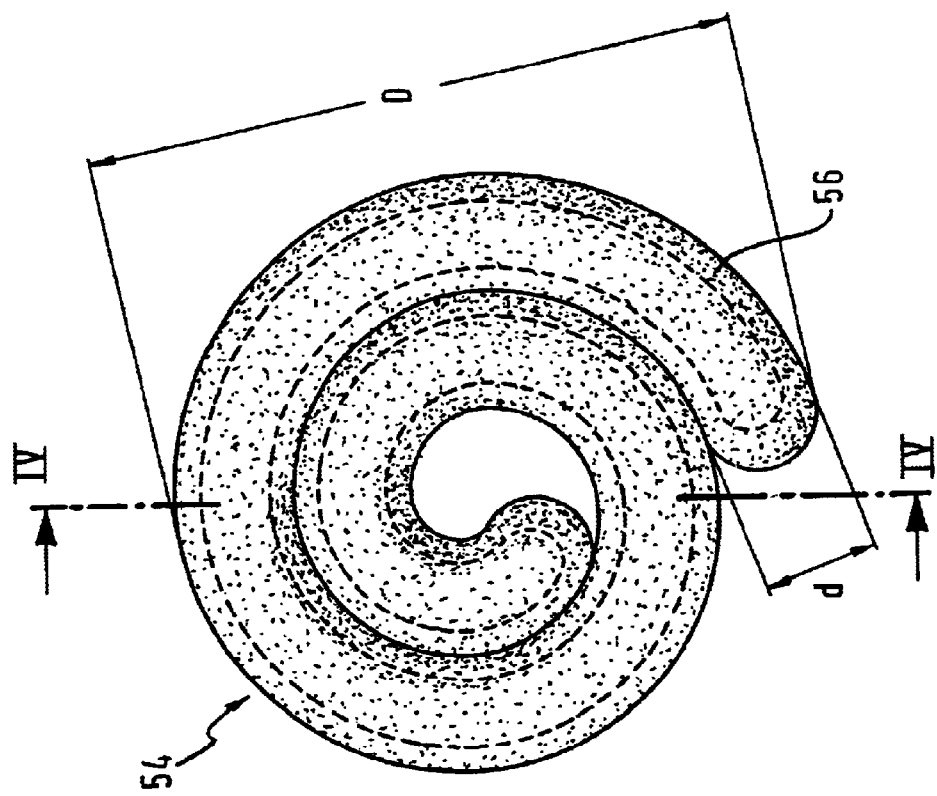
FIG. 3 is a plan view of an example of a baking article produced using the device illustrated in FIG. 1.

In a manner known to the person skilled in the art, an outer material, usually a dough material, can be supplied through the feed duct 52' and an inner material, usually a dough filling or fruit filling, can be supplied through the feed duct 52". The supplied materials pass through the connecting ducts 48' and 48" as well as the tube elements 36' and 36" and out of the mouths 38' and 38". During this process, the mouths 38' and 38" are displaced together by the pivoting device 45, so that a baking article 54 is formed, as Illustrated by way of example in FIGS. 3 and 4.

The baking article 54 comprises a strand 56 in coil form, which is arranged in a plane. The strand 56 is circular in cross section (FIG. 4) and comprises a filling 58 and a casing 60. The diameter d of the strand 56 measures 15 mm, for example, whilst the overall diameter D of the baking article measures 85 mm, for example.

What is claimed is:

1. A nozzle holder for extruding dough materials with at least one nozzle (34'), which is pivotably mounted by means of a joint with a ball (32) and ends at a mouth (38'), which can be displaced by a pivoting device (45) in two axes (X, Y) extending at right angles to one another, at least one connecting duct (48') being constructed in the ball (32), of which one end is connected to a stationary feed duct (50') and the other end to the pivotable nozzle (34'), characterised in that the nozzle holder (14) comprises a second nozzle (34"), which is arranged concentric to the first nozzle (34'), and constructed in the ball (32) is a second connecting duct (48"), of which one end is connected to a second stationary feed duct (50") and the other end to the second nozzle (34").

2. A nozzle holder according to claim 1, characterised in that the nozzles (34'; 34") each comprise a tube element (36'; 36"), of which one end is pivotably mounted and the other end comprises the mouth (38'; 38").

3. A nozzle holder according to claim 1, characterised in that the pivoting device (45) comprises a rod (45) with a ball (42) mounted therein.

4. A device for extruding dough materials, characterised in that at least one nozzle holder according to one of claims 1 to 3 is included.

5. A device according to claim 4, characterised in that a plurality of nozzle holders (14) are arranged adjacent one another, whose mouths (38'; 38") are displaceable together by the pivoting device (45).

6. A device according to claim 4, characterised in that a cutting and/or squeezing device (46) is arranged on the pivoting device (45).

* * * * *